United States Patent
Ott et al.

(10) Patent No.: US 8,554,799 B2
(45) Date of Patent: Oct. 8, 2013

(54) BLOCKS OF TIME WITH METADATA

(75) Inventors: Michael J. Ott, Redmond, WA (US); Tsvi M. Reiter, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 864 days.

(21) Appl. No.: 11/289,840

(22) Filed: Nov. 30, 2005

(65) Prior Publication Data

US 2007/0005626 A1 Jan. 4, 2007

Related U.S. Application Data

(60) Provisional application No. 60/696,296, filed on Jul. 1, 2005.

(51) Int. Cl.
*G06F 17/30* (2006.01)

(52) U.S. Cl.
USPC ............................................. 707/796; 707/791

(58) Field of Classification Search
USPC .................................................. 707/791, 796
See application file for complete search history.

(56) References Cited

U.S. PATENT DOCUMENTS

| | | | | |
|---|---|---|---|---|
| 6,023,702 | A * | 2/2000 | Leisten et al. | 707/102 |
| 7,016,909 | B2 * | 3/2006 | Chan et al. | 707/101 |
| 2001/0011272 | A1 * | 8/2001 | Togawa | 707/101 |

OTHER PUBLICATIONS

Temple, Bob; The Complete Idiot's Guide to Microsoft® Outlook® 2000; May 1999; pp. 183-208.*
"The Function Pointer Tutorials—Callbacks", archived Sep. 9, 2003 (Internet Archive), http://web.archive.org/web/20030909054719/http://www.newty.de/fpt/callback.html.*

* cited by examiner

*Primary Examiner* — Debbie Le
(74) *Attorney, Agent, or Firm* — Microsoft Corporation

(57) ABSTRACT

A method of adding and analyzing metadata to discrete variables, such as time intervals and a system to implement to method is disclosed. The metadata can be aggregated and analyzed using analysis operations such as intersection, union, subtraction and inversion.

24 Claims, 4 Drawing Sheets

BLOCKS OF TIME WITH METADATA

This is a non-provisional of U.S. Provisional Application Ser. No. 60/696,296, filed Jul. 1, 2005, the entire disclosure of which is incorporated herein by reference.

BACKGROUND

In scheduling optimization domain, there are a number of constraints that vary over time. For example, a resource may only be available certain hours each work day, may have work shifts etc. During working or non-working hours, a resource may have different types of commitments or breaks, e.g., blocking appointments, non-blocking tasks, lunch break or vacations. There are other complexities such as a resource may be more effective during mornings than during afternoons. There needs to be a generic way to represent different types of constraints by a generic type that can be aggregated or re-cursed over time and that can be evaluated for type specific values for each expanded instance.

SUMMARY

A method of adding and analyzing metadata to a discrete variable, such as time intervals, and a system to implement the method is disclosed. The metadata can be analyzed and aggregated using analysis operations such as intersection, union, subtraction and inversion. The ability to traverse a set of time blocks and aggregate the blocks may be separated to provide improved implementation efficiencies and less errors in analyzing the time blocks.

DRAWINGS

Figure 3:
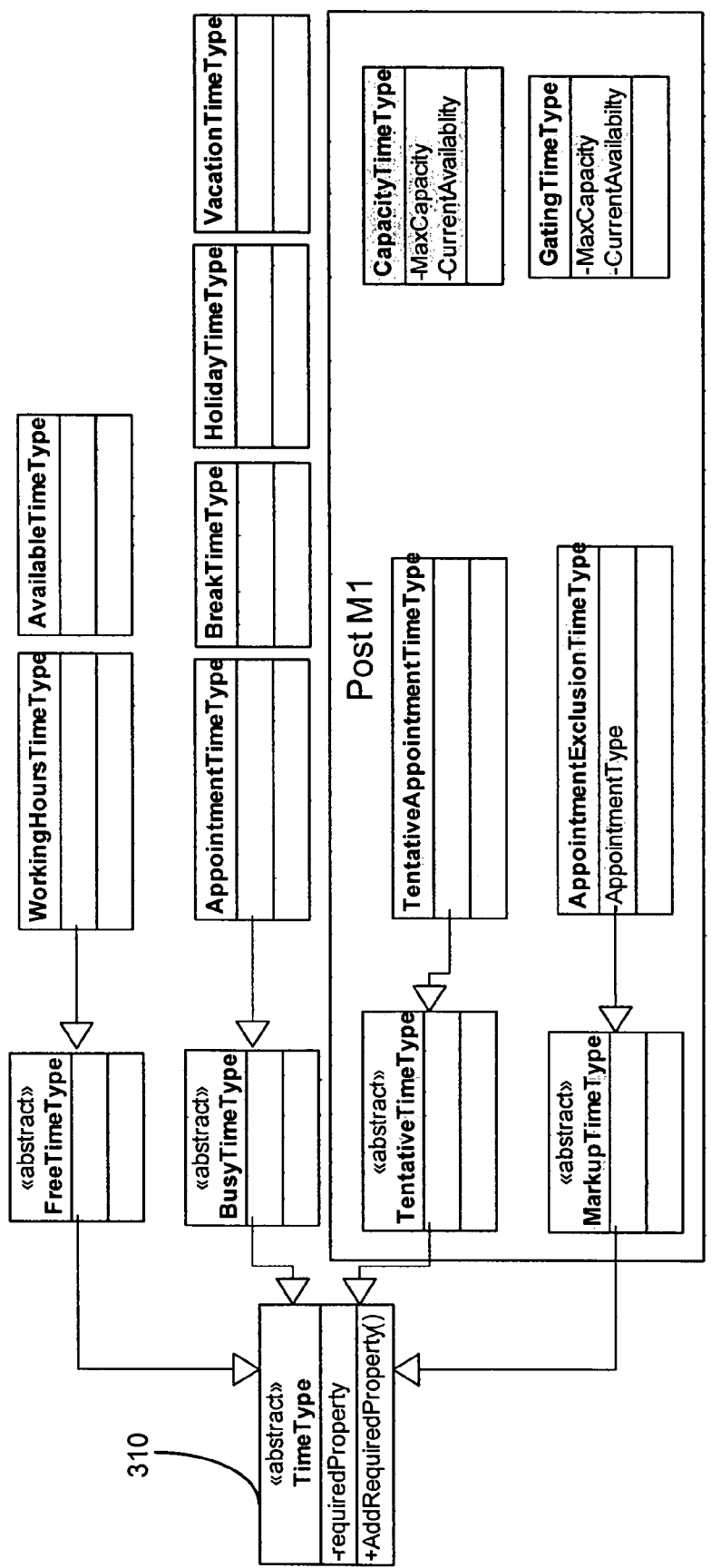

FIG. 3 may be a class diagram used in conjunction with the invention; and

Figure 4:
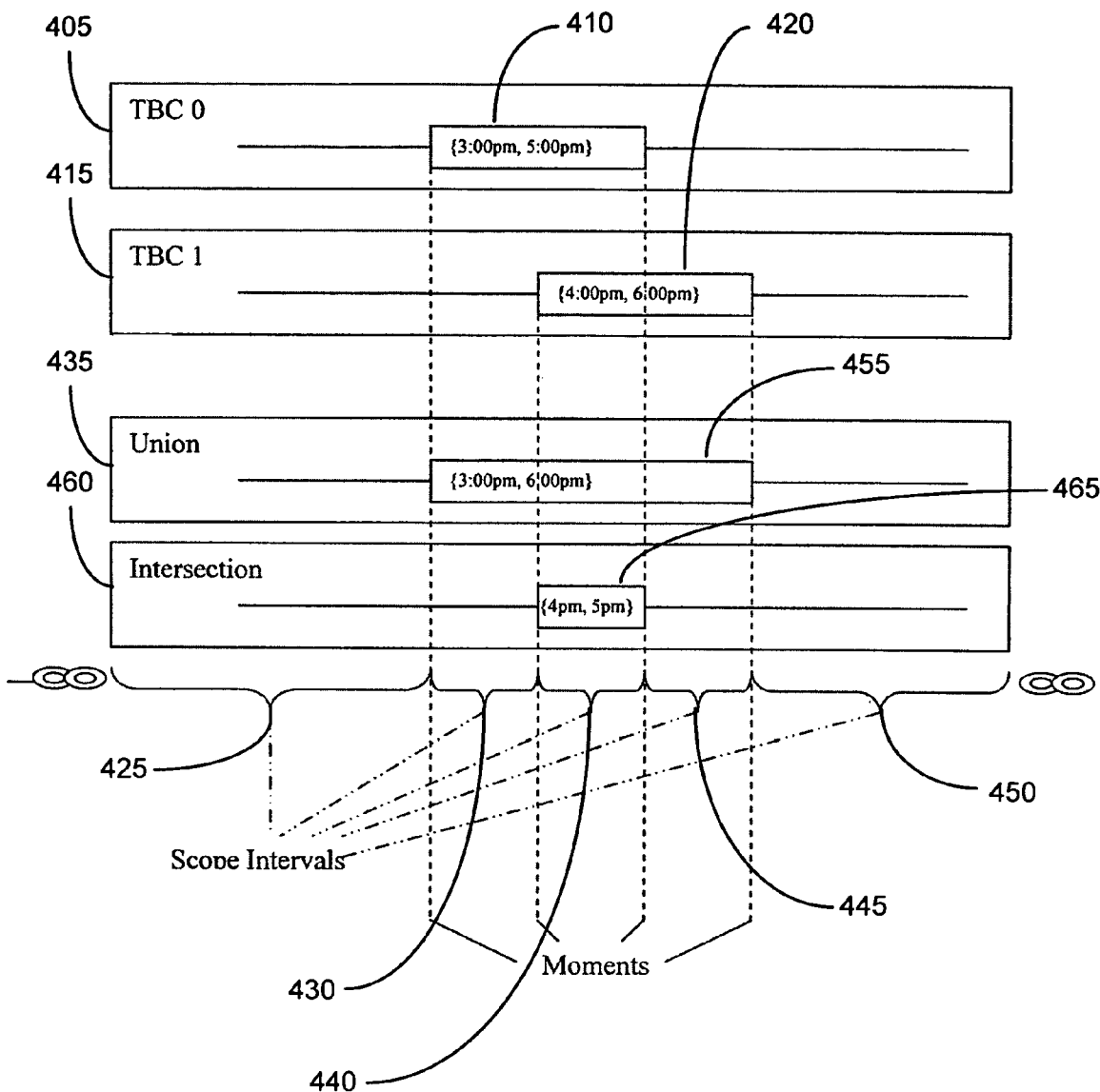

FIG. 4 may be an example of some of the operations that can be performed on time blocks.

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the Word "means" and a function without the recital of any structure, it is not intended that the scope of any claim element be interpreted based on the application of 35 U.S.C. §112, sixth paragraph.

Figure 1:
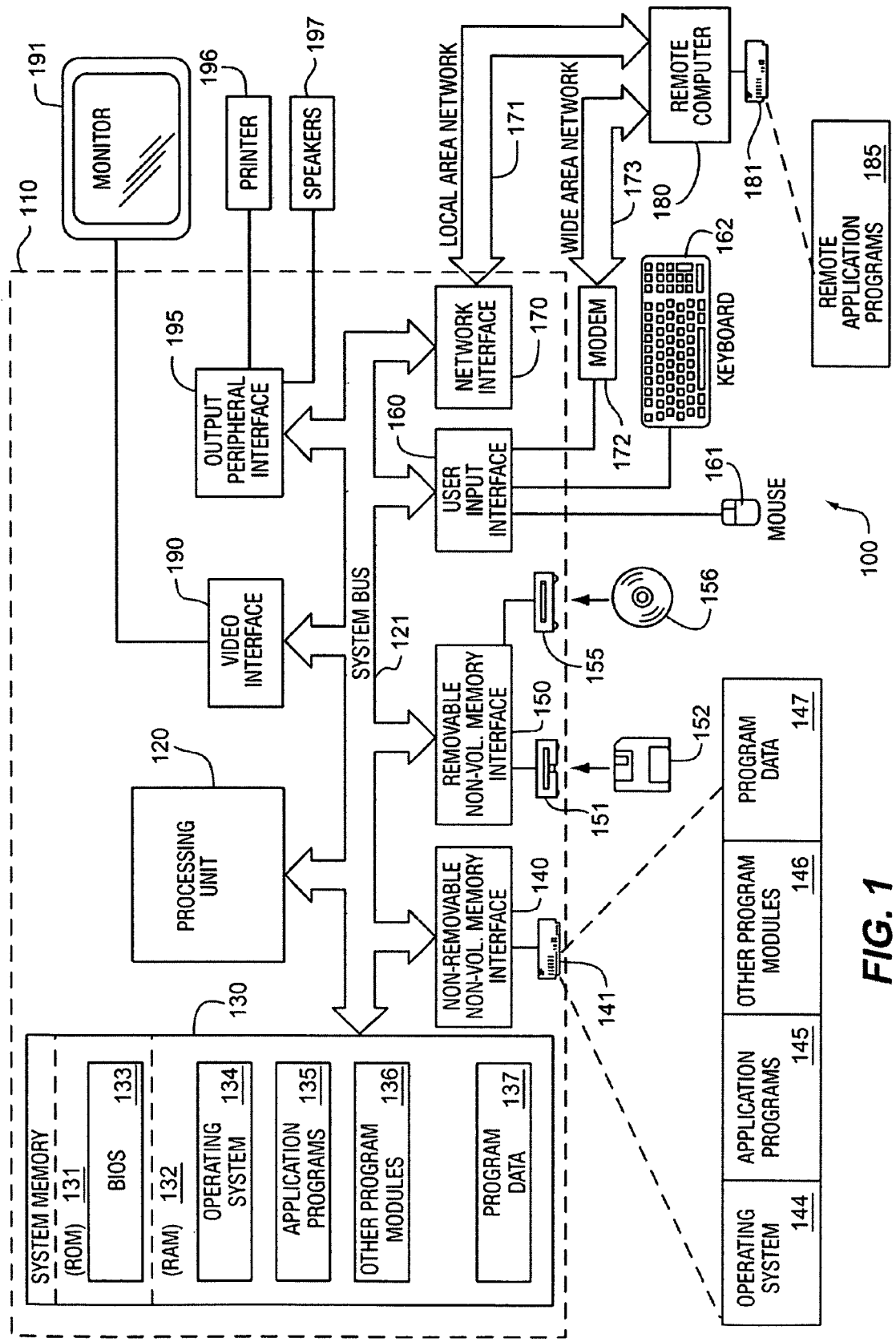
FIG. 1 is a block diagram of a computing system that may operate in accordance with the claims.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitations computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
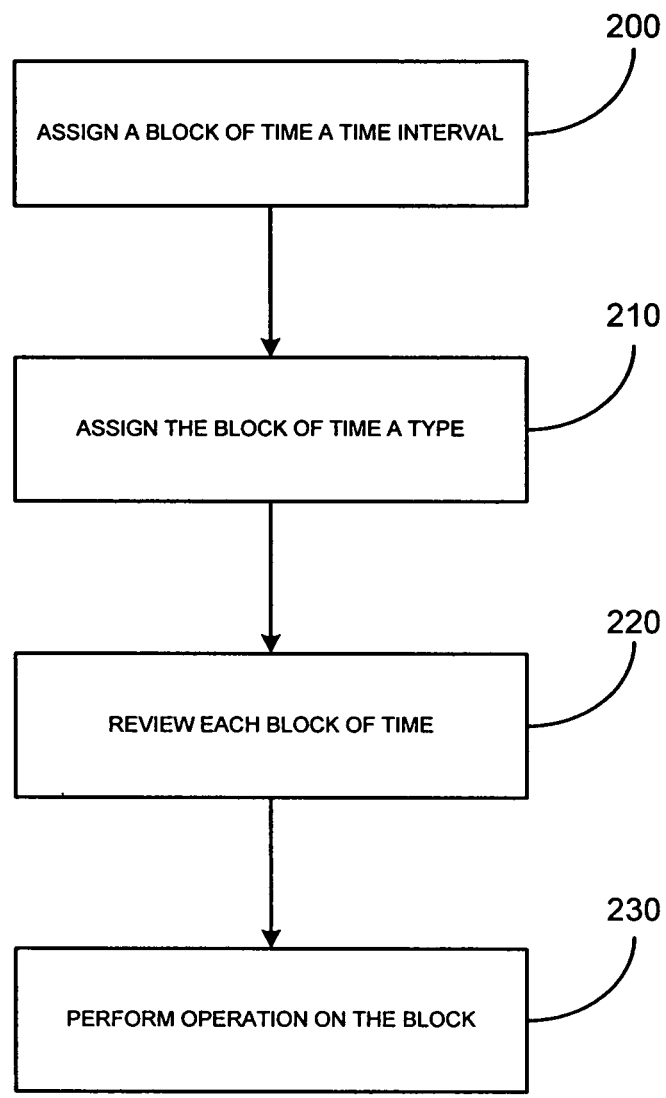
FIG. 2 is an illustration of a method that may be in accordance with the claims.

FIG. 2 may illustrate a method of analyzing discrete variables, such as blocks of time. It is noted that time is used as an example of a discrete variable, but the system and method may be capable of analyzing virtually any discrete variable (and intervals thereof), with time being just one example. At block 200, a block of time may be assigned a time interval wherein the time interval comprises a start time and an end time. At block 210, the block of time may be assigned a type wherein the type is metadata that describes parameters of the block of time. At block 220, a traversal method may review each block of time.

At block 230, an aggregation method may perform operations on the blocks of time wherein the aggregation method operates on the time interval and on the type. The aggregation method may be modified by users to fit the metadata used. The aggregation method may be separate from the traversal method for higher efficiency. The aggregation method may be able to perform analysis operations such as a union operation, an intersection operation, a subtraction operation and an inversion operation on the metadata of the block of time. Certainly, other analysis operations are available.

FIG. 3 may illustrate the background concepts of the claims. The following terms may be used to describe the primary constructs.

TimeInterval may be a primitive data type that describes a time interval. It may have two times: a start time and an end time. Certainly, other time formats are possible but having an agreed upon format makes programming easier. The purpose of using TimeInterval may be to help developers make their code cleaner by replacing two variables (start time and end time or start time and duration) by just one time interval. It may also reduce an ambiguity of different ways of representing the time interval (start time/end time vs. start time/duration). Another benefit may be that this type will significantly decrease probability of making mistakes when coding the time/time interval comparison/evaluating operations like Intersect, Union, AdjacentTo, Contains, etc.

TimeBlock may be an object that describes a time interval but adds an additional type that contains metadata about the interval. An example from the scheduling domain may be capacity information (count or quantity of a resource that is available or consumed).

TimeType 310 may be a type of metadata employed by one implementation of the invention. In this case it is an abstract class that defines interpretation of intervals of time for the purposes of representing static scheduling rules (working hours, appointments, breaks, etc.).

Some previous time block systems used the OrderedTimeIntervalCollection (OTIC) class. The OTIC class may track a set of non-overlapping time intervals and may allow operations such as Union, Intersection, Subtraction, and Inversion. TimeBlockCollection (TBC) is an evolution of the OTIC, in that it allows for metadata to be stored along with time intervals. In this manner, a user may use TBC to implement quantity counts that are available over time, for example. TBC may implement an operation "Aggregate" that allows the client to define aggregations on their time-based metadata (analogous to Union, Intersection, Subtraction, and Inversion). OTIC may be implemented in terms of TBC. TBC aims to separate the traversal code of time-set operations from the aggregation code. This may allow users to define their own metadata and aggregators that operate on, or aggregate, that metadata. In order to accomplish this, the Aggregate method on TBC may find all of the change moments (that is, whenever an interval begins or ends) in each collection and use pairs of these moments (which form what may be called a scope interval) to call the aggregator. The results of calls to the aggregator given the scope interval may be placed in the result collection and merged when the intervals are adjacent and the metadata are equivalent.

FIG. 4 may illustrate an example of the usefulness of TBC. In FIG. 4, Aggregate may be called with a union aggregator and the two TBCs, where each contain one block with no (null) metadata, where TimeBlock 0 (405) has interval {3:00 pm, 5:00 pm} 410 and TimeBlock 1 (415) has interval {4:00 pm, 6:00 pm} 420. Aggregate may call the union aggregator for the first scope interval {−infinity, 3:00 pm} 425 passing it all intervals from the source collections that contain this interval. For this interval, {Empty}, {Empty} may be passed to the aggregator, as neither of the source collections contains this interval. As a union aggregator is being described, it may return a new block on the same interval as the scope interval if at least one of the intervals is non-empty, so for the first scope interval, union will return {Empty}. Next, the second scope interval {3:00 pm, 4:00 pm} 430 may find {3:00 pm, 5:00 pm}, {Empty} as overlapping the scope. Union 435 will return {3:00 pm, 4:00 pm} as the answer. Next the union 435 aggregator may be called for scope {4:00 pm, 5:00 pm} 440, and {4:00 pm, 5:00 pm} is returned. At this point, Aggregate may merge the last two results into {3:00 pm, 5:00 pm} since they are adjacent and their metadata is equivalent (both are null). Next the union 435 aggregator may be called for {5:00 pm, 6:00 pm} 445 and again the result will merge to yield {3:00 pm, 6:00 pm}. The last scope interval {6:00 pm, infinity} 450 will yield empty. So {3:00 pm, 6:00 pm} is the final answer 455. Running through the same exercise using the intersect 460 aggregator may easily be shown to yield {4:00 pm, 5:00 pm} 465 as the final answer.

The signature for an aggregator, as described above, may be TimeBlock[ ] (TimeInterval scope, parameters TimeBlock[ ] args). Writing the above intersection and union aggregators may be easy relative to writing a method like OTIC Union. This is may be because OTIC Union had to handle both traversal and aggregation. In the case of union: for each block in args, if the block is not empty, then method may return a new block on scope, and if none of the intervals equal scope (they are all empty) then empty may be returned.

The above example demonstrates aggregation in the absence of metadata. Note that the addition of metadata does not complicate the problem. It is simply less likely that result blocks will merge. Imagine if the above example was attempting to determine the amount of effort consumed by these two appointments. If the {3:00 pm, 5:00 pm} appointment required 3 effort and the {4:00 pm, 6:00 pm} appointment required 5 effort then the result would be {{3:00 pm, 4:00 pm}, 3 effort}, {{4:00 pm, 5:00 pm}, 8 effort}, and {{5:00 pm, 6:00 pm}, 5 effort}. The amount of effort is considered Time Metadata as far as TBC is concerned.

There are many ways to go about implementing the above aggregation algorithm. The first approach may be to create the scope intervals (time intervals between moments) on the fly. This approach may have a small additional memory footprint relative to the input collections. An array of integer indices may be created into the input TBCs as well as an array of TimeBlocks that may be passed to the aggregator for each scope interval. Determination of the next scope interval may involve looping over all collections and checking the interval at an index stored in the indices array for a start or end time that is the least greater than the previous scope interval's end. Once the scope interval for this iteration is determined, the blocks to pass to the aggregator may be determined by considering the intervals at the current indices and determining which overlap the scope. If at least one of them does not overlap the scope, the index may be incremented. In this way, each of the moments may be walked through once, determining the next moment at each step by looping over the collections.

A second approach may be to create a collection of all the moments first (where moment contains all the information about the TimeBlock and a flag indicating it is a start or end moment), then to loop over them using the information they contain to determine when to "turn on" and "turn off" intervals in the collection of Blocks to hand over to the aggregator. This approach may require more memory than the first approach, but has the advantage that determination of intervals in scope is simple. This approach may also be optimized for slightly better time complexity.

Inversion

In order to implement an inversion aggregator, the method may also consider {-infinity, <first moment>} and {<last moment>, infinity} as scope intervals as well. The union and intersection aggregators may simply ignore these scope intervals. This may affect the speed of the algorithm by a constant factor and thus does not affect the order.

Inclusion Policies on TimeInterval

There may be two approaches to inclusion policies to be taken into account by the aggregators. First, the moments may be determined the same as they are above, and the policies may be passed down to the aggregator to consider. This may make the aggregator significantly more complex, not only that, but it may do work that all aggregators must do to digest the policy differences. The second solution may be to increase the number of moments to include points in time. Thus, the moments for the problem described in FIG. 4 may be [3:00 pm, 3:00 pm], (3:00 pm, 4:00 pm), [4:00 pm, 4:00 pm], (4:00 pm, 5:00 pm), [5:00 pm, 5:00 pm], (5:00 pm, 6:00 pm), and [6:00 pm, 6:00 pm]. Then, aggregators may work exactly as previously described, but the resultant algorithm will now take into account inclusion policies.

Normalize

The algorithm for aggregating intervals as described may depend on the fact that each source collection does not have overlapping intervals. Collections with no overlapping intervals may be called "Normal." There are plenty of cases where the method may need to handle overlapping intervals, such as a capacity based schedule. In this case, there may be many overlapping commitments. One way to address this may be to implement a method Normalize to "flatten" the intervals. Normalize may take into account the metadata stored on each interval as well. In the case of the capacity example, the method may turn two completely overlapping appointments requiring capacities 3 and 5 into one "meta-appointment" or block that has capacity 8. The Normalize operation may be written similarly to Aggregate described above, except that there may be a variable number of blocks passed to the "aggregator" for each scope interval.

In order to abstract TBC from knowing anything about the metadata, for the purpose of the normalize operation, a "Combine" method may be added to the metadata type interface, which will allow Normalize to combine overlapping metadata stores. This approach may leave the semantics of combining metadata to the metadata class author.

OrderedTimeIntervalCollection

For some clients, it may be preferable to not deal with metadata over time, or at least a Boolean value over time is sufficient (interval is present or not present.)

The advantage of moving to a TBC based OTIC is that operations that we use infrequently may not require optimization, and the general purpose aggregators are much less bug-prone.

Sample code for the interfaces may be as follows:

```
public interface ITimeMetadata
{
    bool Equivalent(ITimeMetadata other);
    ITimeMetadata Combine(ITimeMetadata other);
    string ToString(string type);
}
public struct TimeBlock
{
    public TimeBlock(TimeInterval interval, ITimeMetadata metadata);
    public TimeInterval Interval { get; set; }
    public ITimeMetadata Metadata { get; set ; }
    public static readonly TimeBlock Empty;
}
public class TimeBlockCollection : ICollection
{
    // ICollection Methods
    public void Swap(TimeBlockCollection other);
    public void Normalize( );
    public delegate TimeBlock Aggregator(
        TimeInterval scope,
        params TimeBlock[] args);
    public static TimeBlockCollection Aggregate(
        Aggregator aggregator,
        params TimeBlockCollection args);
)
public class OrderedTimeIntervalCollection : ICollection
{
```

```
    // ICollection Methods
    public void Swap(OTIC other);
    public void Normalize( );
    public bool Includes(TimeInterval interval);
    public void Intersect(OTIC other);
    public static OTIC Intersect(params OTIC args);
    public void Union(OTIC other);
    public static OTIC Union(params OTIC args);
    public void Subtract(OTIC other);
    public static OTIC Subtract(OTIC source, OTIC remove);
    public void Invert( );
    public static OTIC Invert(OTIC source);
}
```

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A computer system, comprising:
   a memory;
   a display;
   an input device that is adapted to receive input from a user of the computer system;
   a processor that is operatively coupled to the memory, the display and the input device;
   wherein computer executable instructions are stored in the memory that, when executed by the processor, causes the following steps to be performed:
   assigning a first time interval to a first block of time, the first time interval comprising a first start time and a first end time;
   assigning a first metadata to the first block of time, the first metadata having a first numerical value and a first type;
   assigning a second time interval to a second block of time, the second time interval comprising a second start time and a second end time;
   assigning a second metadata to the second block of time, the second metadata having a second numerical value and a second type;
   determining that the first type of the first metadata matches the second type of the second metadata;
   in response to determining the first type of the first metadata matches the second type of the second metadata, aggregating the first block of time with the second block of time by:
   determining an aggregate time interval using at least one of four different operations between the first time interval and the second time interval, the operations including a union operation, an intersection operation, a subtraction operation, and an inversion operation;

determining an aggregate metadata by combining the first numerical value of the first metadata with the second numerical value of the second metadata;

generating an aggregate time block having the aggregate time interval and the aggregate metadata.

2. The computer system of claim 1, wherein the first metadata type and second metadata type comprises an effort indication.

3. The computer system of claim 1, wherein the first metadata type and second metadata type comprise an indication of capacity.

4. The computer system of claim 1, wherein the first metadata and second metadata are user definable.

5. The computer system of claim 1, wherein the first metadata and second metadata comprise static scheduling rules.

6. The computer system of claim 5, wherein the static scheduling rules comprise working hours for a resource.

7. The computer system of claim 5, wherein the static scheduling rules comprise appointment hours for a resource.

8. The computer system of claim 5, wherein the static scheduling rules comprise break times for a resource.

9. A computer implemented method comprising:

assigning a first time interval to a first block of time, the first time interval comprising a first start time and a first end time;

assigning a first metadata to the first block of time, the first metadata having a first numerical value and a first type;

assigning a second time interval to a second block of time, the second time interval comprising a second start time and a second end time;

assigning a second metadata to the second block of time, the second metadata having a second numerical value and a second type;

determining that the first type of the first metadata matches the second type of the second metadata;

in response to determining the first type of the first metadata matches the second type of the second metadata, aggregating the first block of time with the second block of time by:

determining an aggregate time interval using one or more aggregate operations;

determining an aggregate metadata by combining the first numerical value of the first metadata with the second numerical value of the second metadata;

generating an aggregate time block, having the aggregate time interval and the aggregate metadata.

10. The computer implemented method of claim 9, wherein the first metadata type and second metadata type comprise an effort indication.

11. The computer implemented method of claim 9, wherein the first metadata type and second metadata type comprise an indication of capacity.

12. The computer implemented method of claim 9, wherein the first metadata and second metadata are user definable.

13. The computer implemented method of claim 12, wherein the first metadata and second metadata comprise static scheduling rules.

14. The computer implemented method of claim 13, wherein the static scheduling rules comprise working hours for a resource.

15. The computer implemented method of claim 13, wherein the static scheduling rules comprise appointment hours for a resource.

16. The computer implemented method of claim 13, wherein the static scheduling rules comprise break times for a resource.

17. A computer-readable storage medium having computer-executable instructions that when executed by a processor perform steps comprising:

assigning a first time interval to a first block of time, the first time interval comprising a first start time and a first end time;

assigning a first metadata to the first block of time, the first metadata having a first numerical value and a first type;

assigning a second time interval to a second block of time, the second time interval comprising a second start time and a second end time;

assigning a second metadata to the second block of time, the second metadata having a second numerical value and a second type;

determining that the first type of the first metadata matches the second type of the second metadata;

in response to determining the first type of the first metadata matches the second type of the second metadata, aggregating the first block of time with the second block of time by:

determining an aggregate time interval using one or more operations;

determining an aggregate metadata by combining the first numerical value of the first metadata with the second numerical value of the second metadata;

generating an aggregate time block, having the aggregate time interval and the aggregate metadata.

18. The computer-readable storage medium of claim 17, wherein the first metadata type and second metadata type comprise an effort indication.

19. The computer-readable storage medium of claim 17, wherein the first metadata type and second metadata type comprise an indication of capacity.

20. The computer-readable storage medium of claim 17, wherein the first metadata and second metadata are user definable.

21. The computer-readable storage medium of claim 20, wherein metadata comprises static scheduling rules.

22. The computer-readable storage medium of claim 21, wherein the static scheduling rules comprise working hours for a resource.

23. The computer-readable storage medium of claim 21, wherein the static scheduling rules comprise appointment hours for a resource.

24. The computer-readable storage medium of claim 21, wherein the static scheduling rules comprise break times for a resource.

* * * * *